United States Patent
Lee et al.

(10) Patent No.: US 10,168,752 B2
(45) Date of Patent: Jan. 1, 2019

(54) SYSTEMS AND METHODS FOR DETERMINING A SUSTAINED THERMAL POWER ENVELOPE COMPRISING MULTIPLE HEAT SOURCES

(71) Applicant: QUALCOMM INCORPORATED, San Diego, CA (US)

(72) Inventors: Kwangyoon Lee, San Diego, CA (US); Kai Yee Wan, San Diego, CA (US); Adam Cunningham, San Diego, CA (US); Melanie Dolores Oclima, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/190,181

(22) Filed: Jun. 23, 2016

(65) Prior Publication Data

US 2017/0262030 A1  Sep. 14, 2017

Related U.S. Application Data

(60) Provisional application No. 62/305,341, filed on Mar. 8, 2016.

(51) Int. Cl.
  *G06F 1/00* (2006.01)
  *G06F 1/26* (2006.01)
  *G06F 1/32* (2006.01)
(52) U.S. Cl.
  CPC .............. *G06F 1/26* (2013.01); *G06F 1/3206* (2013.01); *Y02D 10/16* (2018.01)
(58) Field of Classification Search
  CPC ....................................................... G06F 1/26
  See application file for complete search history.

(56) References Cited

U.S. PATENT DOCUMENTS 5,535,401 A  7/1996 Rawson, III et al.
8,170,606 B2  5/2012 Dorsey et al.
(Continued)

FOREIGN PATENT DOCUMENTS

WO  2015042330 A1  3/2015
WO  2015077671 A1  5/2015

OTHER PUBLICATIONS

International Search Report and Written Opinion—PCT/US2017/017149—ISA/EPO—dated Dec. 13, 2017.

*Primary Examiner* — Mohammed H Rehman
(74) *Attorney, Agent, or Firm* — Smith Tempel Blaha LLC

(57) ABSTRACT

Various embodiments of systems and methods are disclosed for determining a thermal power envelope. One method comprises determining a set of component and operating point combinations for a plurality of components in a portable computing device. Each component and operating point combination in the set defines an available operating point for each of the plurality of components. The portable computing device is iteratively set to each of the component and operating point combinations in the set. At each of the component and operating point combinations, power consumption data and skin temperature data is collected from a plurality of temperature sensors. An enhanced thermal power envelope is generated comprising the power consumption data and the skin temperature data for each of the component and operating point combinations.

26 Claims, 15 Drawing Sheets

(56) References Cited

U.S. PATENT DOCUMENTS

| | | | |
|---|---|---|---|
| 8,601,430 B1 * | 12/2013 | Shroff | G06F 17/5081 |
| | | | 716/100 |
| 8,694,719 B2 | 4/2014 | Lassa et al. | |
| 9,037,882 B2 * | 5/2015 | Vadakkanmaruveedu | |
| | | | G06F 1/203 |
| | | | 713/300 |
| 9,052,428 B2 | 6/2015 | Cameron et al. | |
| 9,116,677 B2 | 8/2015 | Jain et al. | |
| 9,465,423 B2 * | 10/2016 | Vadakkanmaruveedu | |
| | | | G06F 1/203 |
| | | | 713/320 |
| 9,632,552 B2 * | 4/2017 | Messick | G06F 1/263 |
| 2003/0110012 A1 | 6/2003 | Orenstien et al. | |
| 2006/0064999 A1 | 3/2006 | Hermerding et al. | |
| 2008/0028778 A1 * | 2/2008 | Millet | G06F 1/206 |
| | | | 62/129 |
| 2008/0234953 A1 | 9/2008 | Ignowski et al. | |
| 2015/0113310 A1 * | 4/2015 | Mistry | H02H 3/006 |
| | | | 713/340 |
| 2015/0220125 A1 * | 8/2015 | Vadakkanmaruveedu | |
| | | | G06F 1/203 |
| 2017/0031431 A1 * | 2/2017 | Khatri | G06F 1/3296 |

* cited by examiner

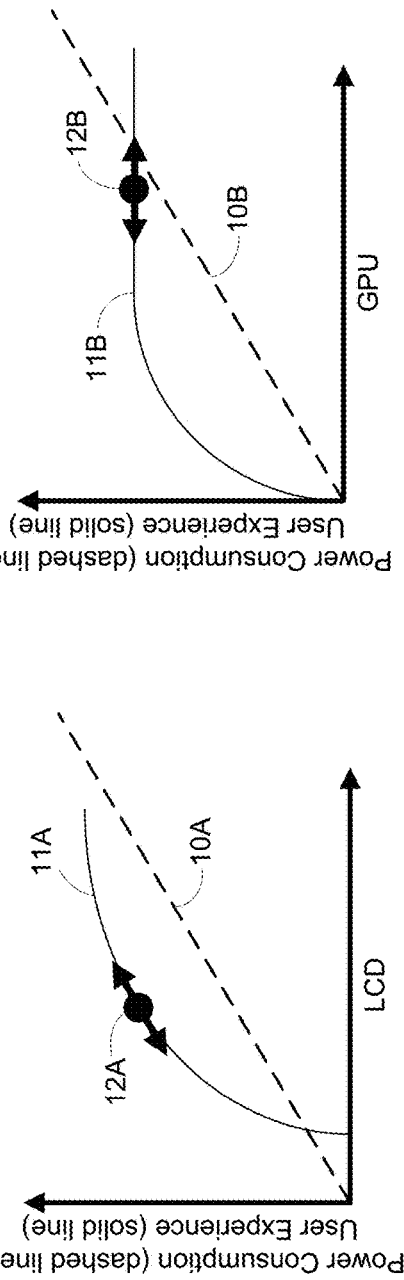
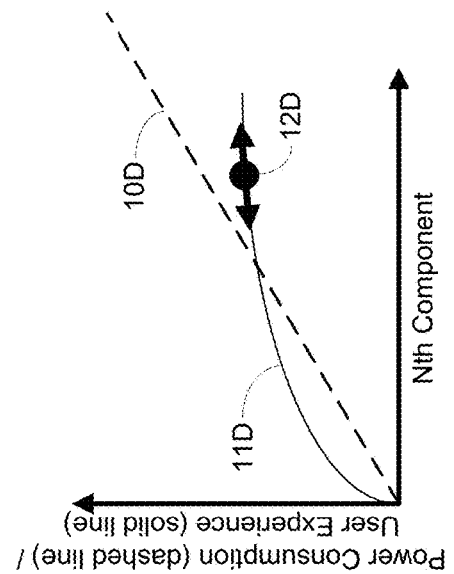
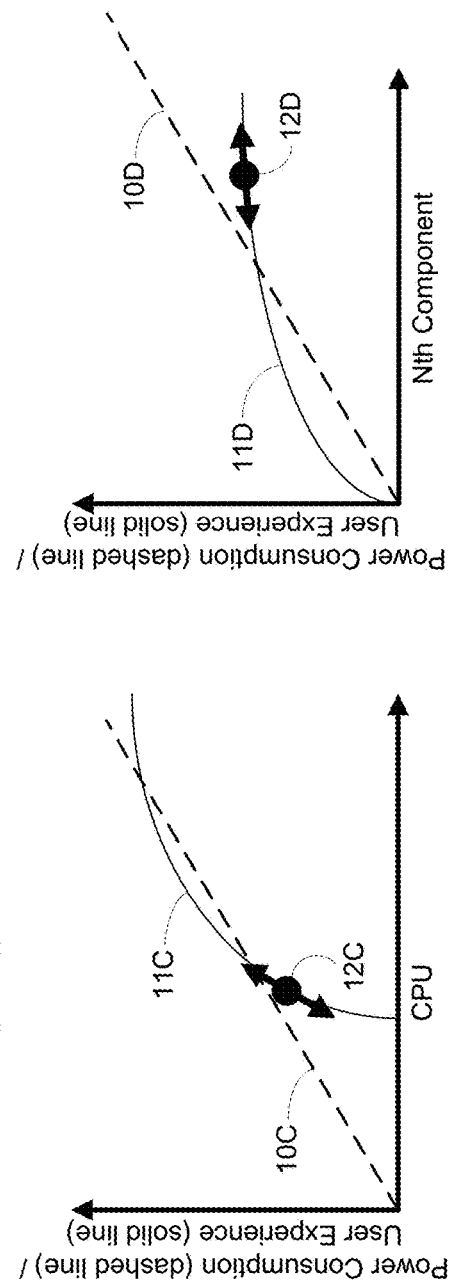

| PROCESSING COMPONENT 1002 | # OF OPERATING POINTS 1004 |
|---|---|
| BIG CLUSTER CPUs | 24 FREQUENCY LEVELS |
| LITTLE CLUSTER CPUs | 12 FREQUENCY LEVELS |
| DISPLAY PROCESSOR | 256 BRIGHTNESS LEVELS |

*FIG. 10*

FIXED OPERATING POINTS 1202

| PC1 1202A | PC2 1202B |
|---|---|
| OP1 | OP1 |

VARIABLE OPERATING POINTS 1204

| PC3 [OP1 ...] 1204A | PC4 [OP1, OP3] 1204B |
|---|---|
| OP1 | OP1 |
| OP1 | OP2 |
| OP1 | OP3 |
| OP2 | OP1 |
| OP2 | OP2 |
| OP2 | OP3 |
| ... | ... |

*FIG. 12*

FIXED OPERATING POINTS 1202

| PC1 1202A | PC2 1202B |
|---|---|
| OP1 | OP1 |

VARIABLE OPERATING POINTS 1204

| PC3 [OP1...] 1204A | PC4 [OP1...OP3] 1204B | POWER 1402 CONSUMED | RUN FULL SUSTAINED TPE TEST? 1404 |
|---|---|---|---|
| OP1 | OP1 | approx. P1 | YES |
| OP1 | OP2 | < P2 | NO |
| OP1 | OP3 | < P2 | NO |
| OP2 | OP1 | approx. P2 | YES |
| OP2 | OP2 | < P3 | NO |
| OP2 | OP3 | < P3 | NO |
| ... | ... | ... | ... |

SYSTEMS AND METHODS FOR DETERMINING A SUSTAINED THERMAL POWER ENVELOPE COMPRISING MULTIPLE HEAT SOURCES

PRIORITY CLAIM AND RELATED APPLICATION

This application claims priority under 35 U.S.C. § 119(e) to U.S. Provisional Application Ser. No. 62/305,341, filed on Mar. 8, 2016, entitled, "SYSTEMS AND METHODS FOR DETERMINING A SUSTAINED THERMAL POWER ENVELOPE COMPRISING MULTIPLE HEAT SOURCES," the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there rarely is enough space within a PCD for engineers and designers to mitigate thermal degradation or failure of processing components by using clever spatial arrangements or strategic placement of passive cooling components. Therefore, current systems and methods rely on various temperature sensors embedded on the PCD chip and elsewhere to monitor the dissipation of thermal energy and then use the measurements to trigger application of thermal power management techniques that adjust workload allocations, processing speeds, etc. to reduce thermal energy generation.

For example, under a heavy processing workload associated with a gaming use case, current systems and methods throttle the voltage and frequency of multiple components to remain within an overall power budget that precludes excessive thermal energy generation. In doing so, the processing workload associated with the gaming use case is not reduced but, rather, the speed at which the workload is processed is slowed. The inevitable result is that excessive thermal energy generation is avoided at the expense of the user experience ("Ux") as measured in user perceived quality of service ("QoS"). That is, throttling the multiple components in a "one size fits all" manner accomplishes the goal of staying within the power budget constraints (thereby reducing thermal energy generation), but causes the user experience to suffer due to throttling components that have minimal impact on the problematic thermal energy generation. As such, current systems and methods for mitigating excessive thermal energy generation by processing components in a PCD may unnecessarily impact the QoS provided to a user.

Existing solutions to these and other problems may employ a sustained power envelope (S-TPE) to determine the effectiveness of a PCD's thermal mechanical design. S-TPE represents the amount of power that the PCD can consume while maintaining a specific skin temperature. Existing methods for determining S-TPE overlook or are unaware of the multi-heat-source nature of the device. In general, existing S-TPE methods collect measurements while applying workload on a single component in the PCD. The resulting S-TPE only reflects the amount of power dissipated in situations where the component in focus is the dominant heat contributor. Problems may arise when a conventional S-TPE is used as a benchmark for the device in all situations. For example, when significant heat is contributed by a component other than that used for S-TPE collection, the S-TPE may diverge from the use case measurements in noticeable and unexpected ways. For the same reason, existing methods for collecting S-TPE may produce results that are inconsistent and difficult to compare across several collection attempts.

Therefore, what is needed in the art is a system and method for determining thermal power envelopes that account for multiple heat sources or hotspots in a PCD.

SUMMARY OF THE DISCLOSURE

Various embodiments of systems and methods are disclosed for determining a thermal power envelope. An exemplary method comprises determining a set of component and operating point combinations for a plurality of components in a portable computing device. Each component and operating point combination in the set defines an available operating point for each of the plurality of components. The portable computing device is iteratively set to each of the component and operating point combinations in the set. At each of the component and operating point combinations, power consumption data and skin temperature data is collected from a plurality of temperature sensors. An enhanced thermal power envelope is generated comprising the power consumption data and the skin temperature data for each of the component and operating point combinations.

An exemplary system comprises a plurality of processing components, a plurality of temperature sensors, and a thermal management module. Each processing component has a plurality of available operating points. The thermal management module is configured to determine a set of component and operating point combinations for a plurality of components in a portable computing device. Each component and operating point combination in the set defines an available operating point for each of the plurality of components. The portable computing device is iteratively set to each of the component and operating point combinations in the set. At each of the component and operating point combinations, power consumption data and skin temperature data is collected from the plurality of temperature sensors. An enhanced thermal power envelope is generated comprising the power consumption data and the skin temperature data for each of the component and operating point combinations.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 1A-1D are exemplary component profile graphs for a given use case, each illustrating a relationship between a performance setting, a user experience relative to the setting, and power consumption associated with the setting.

FIG. 10 is a table illustrating exemplary processing components and corresponding operating points associated with an embodiment of a portable computing device.

FIG. 12 is an exemplary table illustrating fixed and variable operating points.

FIG. 14 illustrates the usage of fixed and variable operating points shown in the table of FIG. 12.

DETAILED DESCRIPTION

Figure 2:
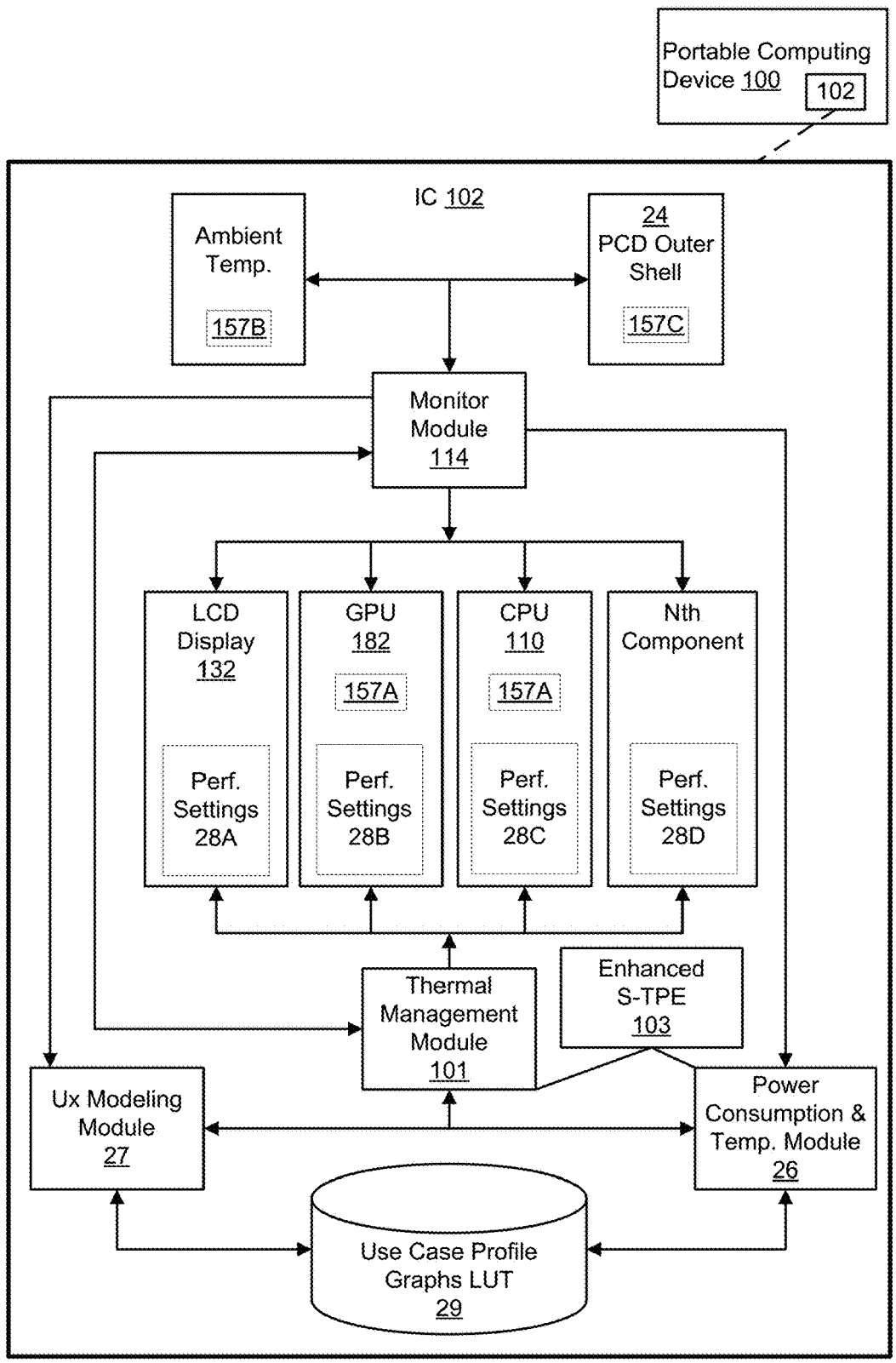
FIG. 2 is a functional block diagram illustrating an embodiment of an on-chip system comprising an intelligent thermal management configured to determine an enhanced thermal power envelope.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload," "use case workload" and the like are used interchangeably and generally directed toward the processing burden, or percentage of processing burden, associated with a given processing component in a given embodiment.

In this description, the terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

The term "use case" is used herein to refer to an instantaneous state of PCD operation in delivering functionality to a user. Inevitably, a use case is tied to the execution of one or more applications by a PCD, such as a gaming application for example. As such, it will be understood that any given use case dictates that one or more components in a PCD are actively consuming power and delivering functionality. Notably, not all use cases require the same combination of active components and/or the same levels of power consumption by active components. Moreover, although a given use case may be largely defined by a single application in execution (such as a gaming application), it will be understood that other applications unrelated to said single application may also be running and contributing to the aggregate power consumption and functionality of the use case.

Managing thermal energy generation in a PCD, without unnecessarily impacting quality of service ("QoS"), can be accomplished with an enhanced sustained power envelope (S-TPE) that accounts for multiple heat sources in the PCD and by monitoring a power budget and/or one or more sensor measurements that correlate with the outer shell temperature (i.e., "skin" temperature of the PCD). By closely monitoring the power budget in view of the skin temperature, an intelligent thermal management solution in a PCD may systematically and individually adjust performance settings of active processing components in an effort to optimize user experience without exceeding a predefined sustained thermal power envelope ("S-TPE") of the PCD. Advantageously, by selectively adjusting performance settings as a function of user experience, intelligent thermal management systems and methods can optimize QoS under any use case workload.

Notably, although exemplary embodiments of intelligent thermal management methods are described herein in the context of a "gaming" use case that leverages processing components in the form of a liquid crystal display ("LCD"), a graphical processing unit ("GPU"), a central processing unit ("CPU"), and an "Nth" component, application of intelligent thermal management methodologies are not limited to gaming use cases or, for that matter, an equivalent combination of processing components. It is envisioned that embodiments of intelligent thermal management methods may be extended to any combination of active components that may reside within a system on a chip ("SoC") and have a use case workload that is adjustable based on one or more performance settings such as, but not limited to, a modem processor, a camera, etc.

Thermal management systems known in the art tend to manage PCD skin temperature without regard for the performance requirements of a running use case. As a PCD runs a given use case, the ongoing consumption of power by the active components generates thermal energy that, when dissipated, may cause the PCD to reach or exceed a sustained thermal power envelope ("S-TPE") for surface temperature (S-TPE being the maximum rate of aggregate power consumption at which the PCD skin temperature may be maintained at or below a certain threshold, such skin temperature threshold being a function of the ambient environmental temperature to which the PCD is exposed). When the skin temperature threshold is approached or exceeded, existing thermal management systems react with a "one-size-fits-all" approach by throttling the performance of active processing components (e.g., CPU, GPU, LCD brightness) to predefined levels regardless of the use case. As a result, thermal management solutions known in the art often achieve the goal of staying within the S-TPE, but do so at an expense to user experience when certain components are throttled unnecessarily.

Advantageously, an intelligent thermal management system and method according to embodiments of the solution recognize that any number of performance level combinations for the active components in a use case may sustain a given TPE power value for a PCD. Depending on the use case, a particular combination of throttling actions may be favorable over another, as one combination may deliver a better user experience when compared to another. For example, use cases with single threads running on a core may benefit from a high fmax on the single core, whereas a used case with multithreaded operations may benefit from having multiple cores online at a relatively lower fmax.

Examples of sustained use cases include, but are not limited to, 1080p video encoding, 3D gaming, Wifi streaming, etc. For the purpose of explanation, certain embodiments of the solution are described herein within the context of a gaming use case that leverages an LCD display, a GPU, a CPU and an Nth component. The description of the exemplary embodiments within the context of such a gaming use case is not meant to limit the scope of the solutions to gaming use cases or, for that matter, imply that the solutions are only applicable to use cases that leverage the same combination of components.

An intelligent thermal management solution takes as inputs a PCD's S-TPE power value and use case profiles. Based on the inputs, various sets of thermal throttling actions that will sustain a desirable surface temperature for the PCD are considered. Consistent with that which is defined above, the S-TPE power value is the rate of aggregate power consumption across active components in a use case at which the skin temperature of the PCD will remain at, or below, a certain acceptable threshold. Notably, and as one of ordinary skill in the art will understand, an acceptable skin temperature threshold for a PCD may be adjusted according to a thermal management policy in view of a changing ambient environmental temperature. As the skin temperature threshold changes, so may the S-TPE power value used by embodiments of the present solution.

FIGS. 1A-1D are exemplary component profile graphs for a given use case, each illustrating a relationship between a performance setting, user experience relative to the setting, and power consumption associated with the setting. Notably, it will be understood that the profile graphs are representative of empirically collected data and, as such, may exist in a query table form in a memory component. As one of ordinary skill in the art would recognize, data instantiated in a table may be represented in a graphical form, such as shown in the FIG. 1 illustrations. Accordingly, for best understanding, the exemplary data of FIG. 1 are depicted and described as profile graphs to better visually illustrate the relationship of performance settings for active components in a use case to an aggregate power consumption and user experience.

Referring to FIG. 1A, moving left to right along the x-axis of the graph represents an increase in the display brightness with which a multimedia output may be rendered. As one of ordinary skill in the art will recognize, an increase in the display brightness setting requires an increase in the power consumed (which also correlates to an increase in thermal energy generation) by the processing component associated with the display brightness parameter (such as an LCD display screen). That is, the higher the display brightness performance setting, the higher the power level required in order to render a graphical output. Accordingly, moving upward along the y-axis represents an increase in power consumption and the dashed line 10A represents the correlation between display brightness and power consumption, as is understood by one of ordinary skill in the art.

In the FIG. 1A graph, the y-axis may also represent a Ux level where moving upward along the y-axis correlates with an improved Ux. Accordingly, as represented by the solid line curve 11A, there is a correlation between the display brightness setting and the Ux level. For the most part, as one of ordinary skill in the art will recognize, a brighter display setting is favorable to a user over a dim display setting. Referring to the curve 11A, the initially steep slope of the curve 11A illustrates that an increase in the display brightness from a relatively low level may produce a significant increase in Ux. By contrast, the upper portion of the slope 11A which corresponds to higher display brightness illustrates that further increases in display brightness will not produce noticeable increases in Ux levels once the display brightness setting is already relatively high. That is, the user may not notice or appreciate the increased display brightness level and, as such, an increase in display brightness will not improve Ux.

With the above in mind, one of ordinary skill in the art will recognize that an increase or decrease in the display brightness, when the display brightness setting is initially relatively low, will generate a larger impact on Ux per watt of power consumption than when the initial display brightness setting is initially relatively high. For example, the point 12A represents an exemplary initial display brightness setting that is neither high nor low (i.e., the component associated with the display brightness setting is rendering a multimedia output associated with a moderate display brightness setting). As such, the slope of a tangent to curve 11A at point 12A indicates that an adjustment down in the display brightness setting will generate moderate power savings (thus saving moderate amounts of thermal energy generation) while moderately impacting Ux. Similarly, an adjustment up in the display brightness setting will require a moderate increase in power consumption (thus a moderate increase in thermal energy generation) while providing a positive, though moderate, impact on Ux.

Referring to FIG. 1B, moving left to right along the x-axis of the graph represents an increase in the number of frames per second ("FPS") at which a multimedia workload may be processed and rendered by a GPU. As one of ordinary skill in the art will recognize, an increase in the FPS rate requires an increase in the power consumed (which also correlates to an increase in thermal energy generation) by the GPU component. Accordingly, moving upward along the y-axis represents an increase in power consumption and the dashed line 10B represents the correlation between FPS rate and power consumption, as is understood by one of ordinary skill in the art.

In the FIG. 1B graph, the y-axis may also represent a user experience ("Ux") level where moving upward along the y-axis correlates with an improved Ux. Accordingly, as represented by the solid line curve 11B, there is a correlation between the FPS level and the Ux level. Referring to the curve 11B, the initially steep slope of the curve 11B illustrates that an increase in the FPS level from a relatively low level may produce a significant increase in Ux. By contrast, the flatter portion of the slope 11B which corresponds to higher FPS levels illustrates that further increases in FPS levels will not produce noticeable increases in Ux levels once the FPS level is already relatively high.

With the above in mind, one of ordinary skill in the art will recognize that an increase or decrease in the FPS level, when the FPS level is initially relatively low, will generate a larger impact on Ux per watt of power consumption than when the initial FPS level is initially relatively high. For example, the point 12B represents an exemplary initial FPS level that is relatively high, i.e. the multimedia processing component associated with the FPS visual multimedia parameter is processing a multimedia workload at a high processing speed. As such, the slope of a tangent to curve 11B at point 12B is relatively flat and indicates that an adjustment down in the FPS level will generate power savings (thus lowering thermal energy generation) without significant impact to Ux. Similarly, an adjustment up in the FPS level will require increased power consumption (thus increased thermal energy generation) without a positive impact on Ux.

As one of ordinary skill in the art will understand, the FPS visual multimedia parameter affects the speed at which a multimedia use case workload is processed (such as a gaming use case). One or more other visual multimedia parameters, however, such as, but not limited to, color depth, display brightness, GPU processing resolution, image dynamics and resolution scaling ratio may cooperate to determine an aggregate multimedia workload that must be processed by one or more multimedia processing components or determine a power consumption level required to render a multimedia output. Advantageously, therefore, adjustment of one or more of the visual multimedia parameters associated with the GPU may either reduce the multimedia workload such that less power consumption is required to process the workload or may save in power consumption required to render an output of a multimedia workload. The FPS parameter is used herein for illustrative purposes and is not meant to suggest that the FPS parameter is the only performance setting associated with a GPU that may be adjusted according to an embodiment of the solution.

Referring to FIG. 1C, moving left to right along the x-axis of the graph represents an increase in the processing speed of one or more cores associated with a CPU. For use cases that require a single thread execution, the graph may be viewed from the perspective of a single core, whereas for a use case that requires a multithread execution, the graph may be viewed from the perspective of an individual one or the multiple cores or as an aggregate of the multiple cores. As one of ordinary skill in the art will recognize, an increase in the processing level requires an increase in the power consumed (which also correlates to an increase in thermal energy generation) by the CPU. That is, the higher the processing setting, the larger the workload that may be processed over a period of time (i.e., millions of instructions per second (MIPS)). Accordingly, moving upward along the y-axis represents an increase in power consumption and the dashed line 10C represents the correlation between processing speed and power consumption, as is understood by one of ordinary skill in the art.

In the FIG. 1C graph, the y-axis may also represent a Ux level where moving upward along the y-axis correlates with an improved Ux. Accordingly, as represented by the solid line curve 11C, there is a correlation between the CPU processing speed level and the Ux level. Referring to the curve 11C, the initially steep slope of the curve 11C illustrates that an increase in processing speed from a relatively low level may produce a significant increase in Ux. By contrast, the upper portion of the slope 11C which corresponds to higher processing speeds illustrates that further increases in processing speed levels will not produce noticeable increases in Ux levels once the processing speed is already relatively high. That is, the user may not notice or appreciate the increased speed in execution of instructions and, as such, an increase will not improve Ux.

With the above in mind, one of ordinary skill in the art will recognize that an increase or decrease in the processing speed level, when the processing speed level is initially relatively low, will generate a larger impact on Ux per watt of power consumption than when the initial processing speed level is initially relatively high. For example, the point 12C represents an exemplary initial CPU processing speed level that is relatively low (i.e., the CPU is processing at a relatively low MIPS level). As such, the slope of a tangent to curve 11C at point 12C is relatively steep and indicates that an adjustment down in the processing speed setting will generate little power savings (thus saving little thermal energy generation) while significantly impacting Ux detrimentally. Similarly, an adjustment up in the processing speed setting will require only a small increase in power consumption (thus a small increase in thermal energy generation) while providing a significant and positive impact on Ux.

Referring to FIG. 1D, moving left to right along the x-axis of the graph represents an increase in the processing speed of an "Nth" component that is active within a given use case. As one of ordinary skill in the art will recognize, an increase in the Nth component processing setting requires an increase in the power consumed (which also correlates to an increase in thermal energy generation) by the Nth component. Accordingly, moving upward along the y-axis represents an increase in power consumption and the dashed line 10D represents the correlation between Nth component processing speed and power consumption, as is understood by one of ordinary skill in the art.

In the FIG. 1D graph, the y-axis may also represent a user experience ("Ux") level where moving upward along the y-axis correlates with an improved Ux. Accordingly, as represented by the solid line curve 11D, there is a correlation between the Nth component performance setting and the Ux level. Referring to the curve 11D, the initially steep slope of the curve 11D illustrates that an increase in the Nth component performance setting from a very low setting may produce a significant increase in Ux. By contrast, the flatter portion of the slope 11D which corresponds to moderate and high Nth component performance settings illustrates that further increases in the setting beyond relatively low levels will not produce noticeable increases in Ux levels.

With the above in mind, one of ordinary skill in the art will recognize that an increase or decrease in the Nth component performance setting, when the Nth component performance setting is initially very low, will generate a more appreciable impact on Ux per watt of power consumption than when the initial Nth component performance setting is initially relatively moderate or even high. For example, the point 12D represents an exemplary initial Nth component performance setting that is relatively high (i.e., the Nth component is processing a workload at a high level). As such, the slope of a tangent to curve 11D at point 12D is relatively flat and indicates that an adjustment down in the Nth component performance setting will generate power savings (thus lowering thermal energy generation) without significant impact to Ux. Similarly, an adjustment up in the Nth component performance setting will require increased power consumption (thus increased thermal energy generation) with no noticeable impact on Ux.

Based on a weighted sum calculation of Ux according to profile graph performance settings, embodiments of the system and method may systematically adjust one or more performance settings to optimize Ux while adjusting overall power consumption to stay within an S-TPE for the PCD. As a non-limiting example, the performance settings of the various components active according to a gaming use case collectively contribute to an overall Ux level and an overall power consumption level associated with the use case. As explained above, an increase or decrease in the active setting for any one of the components may affect both overall Ux and overall power consumption. Advantageously, in the event that power consumption should be increased or decreased, embodiments of the intelligent thermal management solution seek to make such power consumption adjustments (and, by extension, thermal energy generation adjustments) in a manner that optimizes Ux without causing the S-TPE to be exceeded.

FIG. 2 is a functional block diagram illustrating an embodiment of an on-chip system 102 for implementing intelligent thermal management in a portable computing device ("PCD") 100 through selective adjustments of component performance settings 28 in view of an enhanced sustained thermal power envelope (S-TPE 103). Advantageously, by selectively adjusting one or more component performance settings 28 associated with active components in a given use case, embodiments of intelligent thermal management systems and methods may address thermal power envelope constraints without overly impacting the overall user experience ("Ux"). Furthermore, the enhanced S-TPE 103 resolves the problems of inaccurate and inconsistent S-TPE data by including multiple heat sources as a factor. As described below in more detail in connection with FIGS. 6-12, the enhanced S-TPE 103 is generated by collecting power and skin temperature data at different operating points of every heat-generating component in the system. This enables the S-TPE 103 to quantify and account for independent contributions of each system component under different combinations of operating points and use case scenarios.

As illustrated in FIG. 2, the system employs three main modules which, in some embodiments, may be contained in one or two modules: (1) a power consumption and temperature ("PCT") module 26 for analyzing temperature readings and component performance settings 28 settings monitored by a monitor module 114 (notably, monitor module 114 and PCT module 26 may be one and the same in some embodiments) and determining intelligent thermal power management actions; (2) a User Experience ("Ux") modeling module 27 for selecting component performance settings adjustments according to intelligent thermal power management actions received from PCT module 26; and (3) a Thermal Power Management ("TPM") module 101 for adjusting component performance settings 28 according to instructions received from Ux modeling module 27. The enhanced S-TPE 103 may be generated and used during operation of the PCD 100 by one or more of these modules. As illustrated in FIG. 2, in an embodiment, the TPM module 101 and the PCT module 26 may interface with the enhanced S-TPE 103 stored in a memory. It should be appreciated that embodiments of systems and methods that include the enhanced TPE 103 and the three main modules may optimize the overall Ux with use case workload processing and output while maintaining an aggregate power consumption within a predetermined power budget (or, by extension, PCD skin temperature beneath acceptable thresholds).

In the exemplary embodiment of FIG. 2, monitor module 114 monitors various visual component performance settings 28 and levels associated with active processing components LCD display 132, GPU 182, CPU 110 and Nth component. Also, the monitor module 114 may monitor temperature sensors 157 associated with various components or aspects of the PCD 100 including, but not limited to, silicon junctions in core(s) of GPU 182, package on package ("PoP") memory components 112A, and/or the outer shell 24, i.e. "skin," of the PCD 100. The monitor module 114 may relay data indicative of the active settings of the component performance settings 28 and/or the temperatures measured by the sensors 157 to the PCT module 26 and/or the TPM module 101.

Notably, a change in the ambient environmental temperature measured by sensor 157B (or otherwise calculated) may be recognized by the monitor module 114 and relayed to TPM module 101. The TPM module 101 may, in turn, adjust the maximum allowed S-TPE to ensure that the PCD outer shell temperature 24 (i.e., skin temperature) as measured by sensor 157C is maintained below a given threshold. The S-TPE, as it may be defined at any given moment, is used as an input to an intelligent thermal management solution to determine which, if any, of the performance settings for active components in an ongoing use case should be adjusted.

From the data provided by the monitor module 114, the PCT module 26 may recognize that a thermal temperature threshold has been, or could be, exceeded and determine that power consumption associated with active processing components should be adjusted in order to mitigate ongoing thermal energy generation. Similarly, from the data provided by the monitor module 114 regarding active performance settings 28, the PCT module 26 may calculate an overall power consumption level of the processing components 132, 182, 110, Nth and compare it to a predetermined power budget (i.e., the current S-TPE). To calculate the overall power consumption level from the performance settings 28, the PCT module 26 may query the use case profile graphs lookup table ("LUT") 29 which contains performance data such as those depicted in FIG. 1. Advantageously, for each active setting monitored by the monitor module 114, the PCT module 26 may map a point 12 on a curve 11 in the appropriate visual multimedia parameter graph (or query its equivalent from a table of data) and, based on the x-axis value of the point 12, determine a power consumption associated with the current performance setting of the given active component. Subsequently, an aggregate power consumption level associated with all the current performance settings may be calculated by the PCT module 26 and compared to a predefined power budget.

In accordance with the enhanced S-TPE 103, if a temperature threshold or a power budget has been exceeded, then the PCT module 26 may instruct the Ux modeling module 27 to determine appropriate adjustments to one or more of the performance settings 28 of the components that are actively processing workloads per the given use case. Similarly, if the PCT module 26 determines that there is available headroom in the power budget, i.e., that user experience may be improved by an increase in power consumption that will not cause the power budget to be exceeded (and, by extension, will not cause the skin temperature threshold to be exceeded), then the PCT module 26 may instruct the Ux modeling module 27 to determine appropriate adjustments to one or more of the performance settings 28 of the processing components.

The Ux modeling module 27, upon receiving instructions from the PCT module 26 to adjust one or more performance settings 28 either up or down, queries LUT 29 and compares profile graphs associated with the components running per the present use case. Having also received the current performance settings 28 from the monitor module 114, the Ux modeling module 27 maps a point 12 on a curve 11 in the appropriate profile graph for each current setting. Based on the slope of the tangent for each point 12, the Ux modeling module 27 may determine which performance setting(s) 28 should be adjusted in order to optimize the user experience within the power consumption constraints dictated by the PCT module 26.

For instance, if the PCT module 26 has instructed that thermal energy generation should be mitigated by reducing power consumption, the Ux modeling module 27 may identify those tangents having slopes that are relatively flat and subsequently select the associated settings for adjustment. In this way, the detrimental impact on user experience may be kept at a minimum per unit of power saved as a result of an adjustment. Similarly, if the PCT module 26 has instructed that power consumption may be increased without exceeding a TPE power budget, the Ux modeling module 27 may identify those tangents having slopes that are relatively steep and subsequently select the associated parameters for adjustment. In this way, the impact on user experience may be maximized per additional unit of power consumed as a result of an adjustment.

Notably, it is envisioned that some embodiments of the system and method may identify the single performance setting 28 having the most favorable tangent slope and then adjust the performance setting 28 only as much as is necessary to capture the targeted power savings or consumption increase. Other embodiments may adjust a first performance setting only up to the point that the adjusted setting defines a tangent having a slope that is less favorable than the slope of a tangent associated with a second performance setting 28, at which point the setting of the second performance setting is adjusted accordingly. Still other embodiments, instead of making a setting adjustment and gathering feedback from the monitor module 114 before determining a second setting adjustment, may calculate a plurality of adjustments across multiple performance settings 28 and then make all adjustments at the same time.

Returning to the FIG. 2 embodiment, the Ux modeling module 27 may instruct the TPM module 101 to make certain adjustments in the performance settings 28 associated with one or more of the active processing components 132, 182, 110, Nth in the use case. Notably, as explained above, the performance settings 28 may be associated with any power consuming component, aspect or function of the PCD 100 that affects the ongoing use case.

Figure 3:
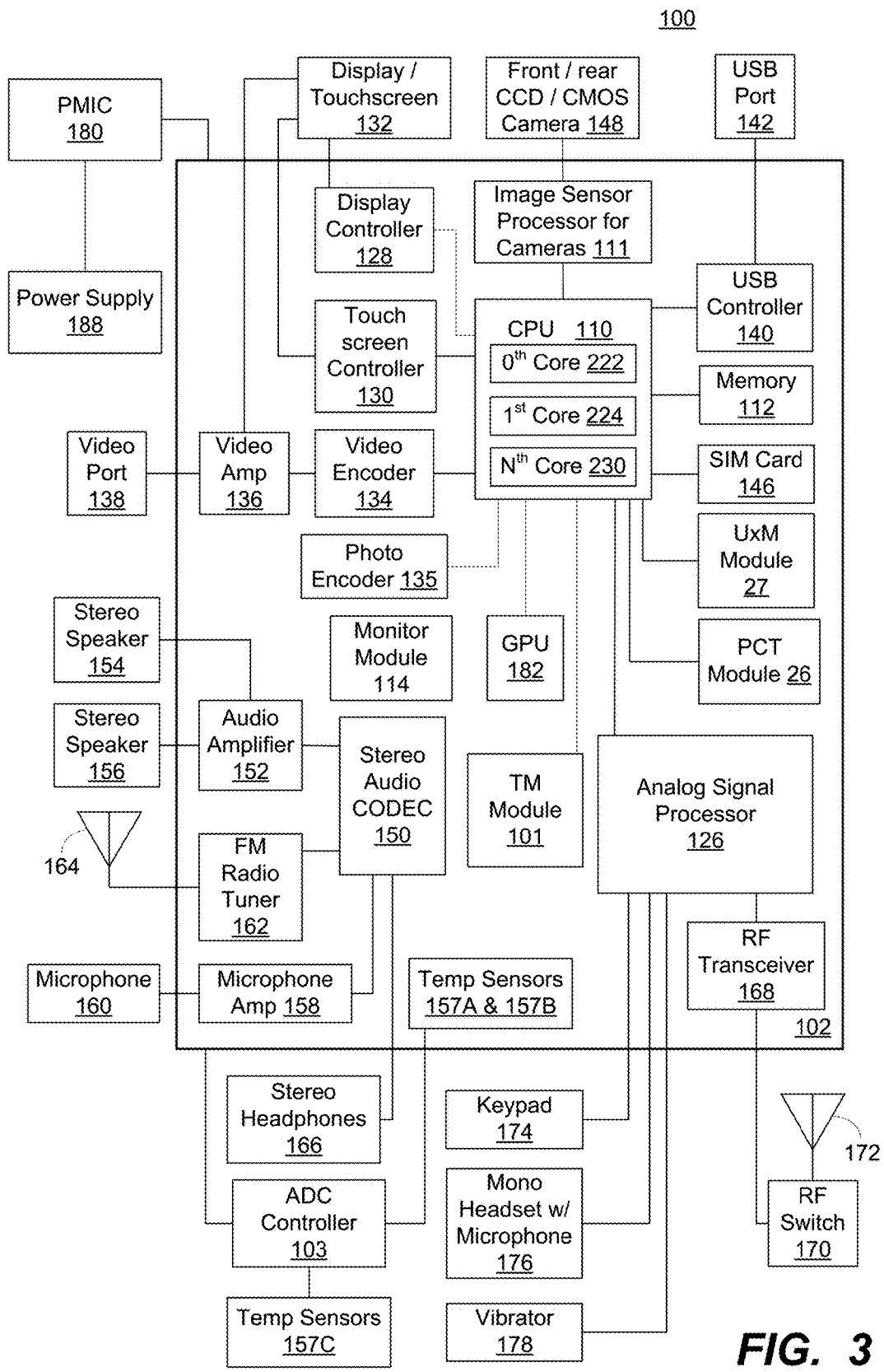
FIG. 3 is a functional block diagram illustrating an exemplary embodiment of a portable computing device for implementing methods and systems for intelligent thermal management.

FIG. 3 is a functional block diagram illustrating an exemplary, non-limiting aspect of the PCD 100 of FIG. 2 in the form of a wireless telephone for implementing methods and systems for intelligent thermal management. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the PCT module 26, Ux model module 27 and TPM module 101 may be collectively responsible for selecting and making adjustments to performance settings associated with active processing components according to a given use case, such as GPU 182, such that power consumption (and, by extension, thermal energy generation) is managed and user experience is optimized.

The monitor module 114 may communicate with multiple operational sensors (e.g., thermal sensors 157A, 157B) distributed throughout the on-chip system 102 and with the CPU 110 of the PCD 100 as well as with the Ux model module 27 and PCT module 26. In some embodiments, monitor module 114 may also monitor skin temperature sensors 157C for temperature readings associated with a touch temperature of PCD 100. In other embodiments, monitor module 114 may infer touch temperatures based on a likely delta with readings taken by on chip temperature sensors 157A, 157B. The PCT module 26 may work with the monitor module 114 to identify temperature thresholds and/or power budgets that have been exceeded and instruct the application of performance settings 28 adjustments associated with power consuming components within chip 102 in an effort to stay within an S-TPE without unnecessarily impacting user experience.

As illustrated in FIG. 3, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 3, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 3, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 3, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 3 further indicates that a radio frequency ("RF") transceiver 168 may be coupled to the analog signal processor 126. An RF switch 170 may be coupled to the RF transceiver 168 and an RF antenna 172. As shown in FIG. 3, a keypad 174 may be coupled to the analog signal processor 126. Also, a mono headset with a microphone 176 may be coupled to the analog signal processor 126. Further, a vibrator device 178 may be coupled to the analog signal processor 126. FIG. 3 also shows that a power supply 188, for example a battery, is coupled to the on-chip system 102 through power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The PCT module(s) 26, Ux model module(s) 27 and/or TPM module(s) 101 may comprise software which is executed by the CPU 110. However, the PCT module(s) 26, Ux model module(s) 27 and TPM module(s) 101 may also be formed from hardware and/or firmware without departing from the scope of the invention. The PCT module 26, Ux model module 27 and TPM module 101 may be collectively responsible for selecting and making adjustments to performance settings associated with active processing components in a given use case such that power consumption (and, by extension, thermal energy generation) is managed and user experience is optimized.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more PCT module(s) 26, Ux model module(s) 27 and/or TPM module(s) 101. These instructions that form the module(s) 101, 26, 27 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 4:
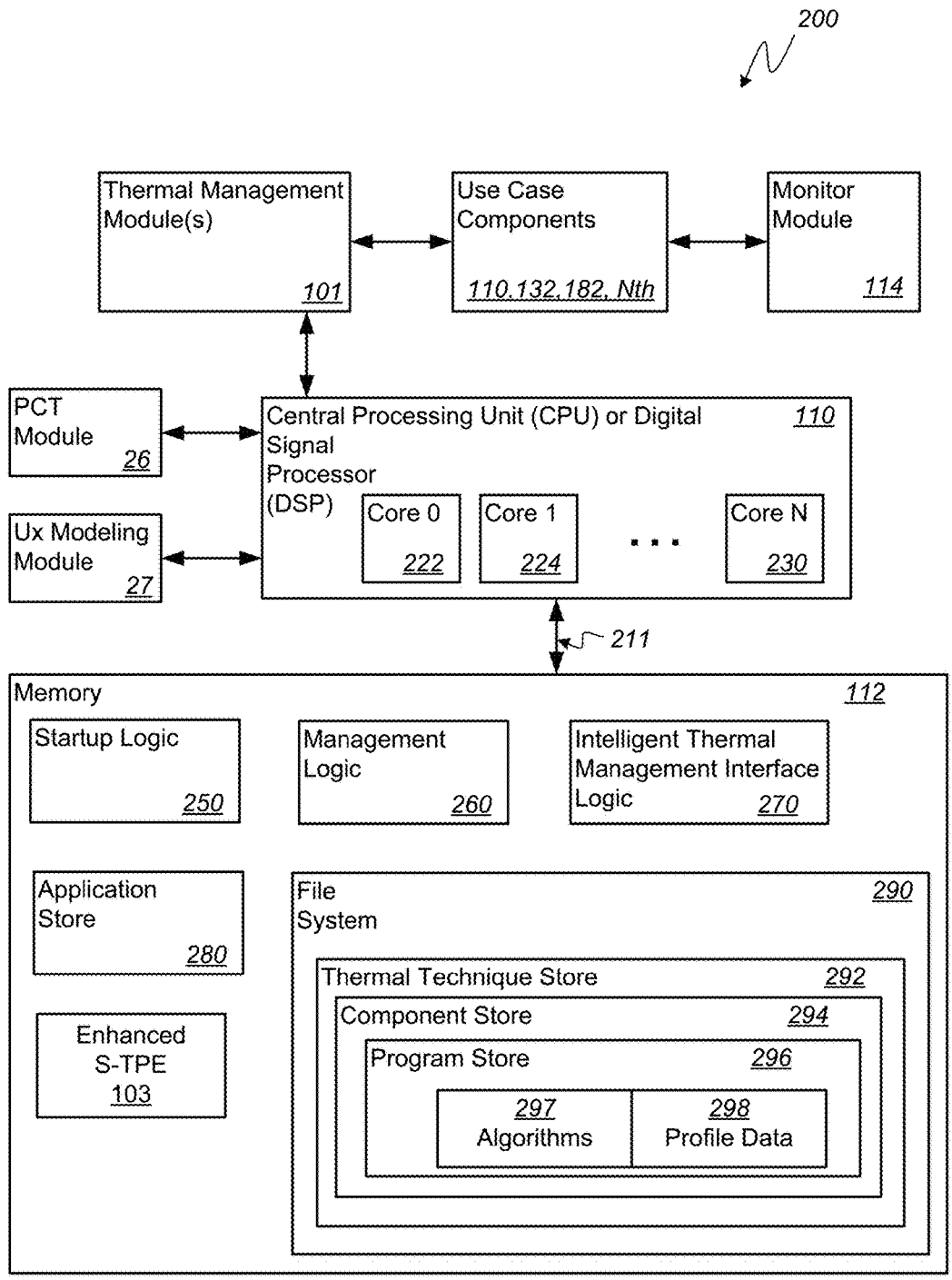
FIG. 4 is a schematic diagram illustrating an exemplary software architecture of the portable computing device of FIG. 3 for intelligent thermal management using an enhanced thermal power envelope.

FIG. 4 is a schematic diagram illustrating an exemplary software architecture of the PCD 100 of FIG. 3 for intelligent thermal management. Any number of algorithms may form or be part of at least one intelligent thermal power management policy that may be applied by the PCT module(s) 26, Ux model module(s) 27 and/or TPM module(s) 101 when certain thermal conditions are met, however, in a preferred embodiment the PCT module(s) 26, Ux model module(s) 27 and TPM module(s) 101 work together to adjust performance settings 28 of active processing components in a use case including, but not limited to, LCD display 132, GPU 182, CPU 110 and Nth component.

As illustrated in FIG. 4, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the PCT module(s) 26, Ux model module(s) 27 and/or TPM module(s) 101 that may comprise software and/or hardware. If embodied as software, the module(s) 26, 27, 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 4, it should be noted that one or more of startup logic 250, management logic 260, intelligent thermal management interface logic 270, applications in application store 280 and portions of the file system 290 may be stored on any computer-readable medium (or device) for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the intelligent thermal management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the comparison, by the PCT module 26, of various temperature measurements or power consumption levels with threshold temperature settings or power budget settings associated with an active processing component or aspect. An exemplary select program can be found in the program store 296 of the embedded file system 290 and is defined by a specific combination of an intelligent thermal management algorithm 297 and a set of profile graphs 298. The exemplary select program, when executed by one or more of the core processors in the CPU 110 may operate in accordance with one or more signals provided by the monitor module 114 in combination with control signals provided by the one or more PCT module(s) 26, Ux model module(s) 27 and/or TPM module(s) 101 to adjust the performance setting associated with a particular active component "up" or "down."

The management logic 260 includes one or more executable instructions for terminating an intelligent thermal management program, as well as selectively identifying, loading, and executing a more suitable replacement program. The management logic 260 is arranged to perform these functions at run time or while the PCD 100 is powered and in use by an operator of the device. A replacement program can be found in the program store 296 of the embedded file system 290 and, in some embodiments, may be defined by a specific combination of an intelligent thermal management algorithm 297 and a set of profile graphs 298.

The replacement program, when executed by one or more of the core processors in the digital signal processor may operate in accordance with one or more signals provided by the monitor module 114 or one or more signals provided on the respective control inputs of the various processor cores to adjust the settings of one or more performance settings 28 associated with processing components 132, 182, 110 and Nth.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the component profile graphs associated with a particular use case.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various profile graphs 298 and algorithms 297 used by the PCD 100. As shown in FIG. 4, the store 292 includes a component store 294, which includes a program store 296, which includes one or more intelligent thermal management programs.

Figure 5A:
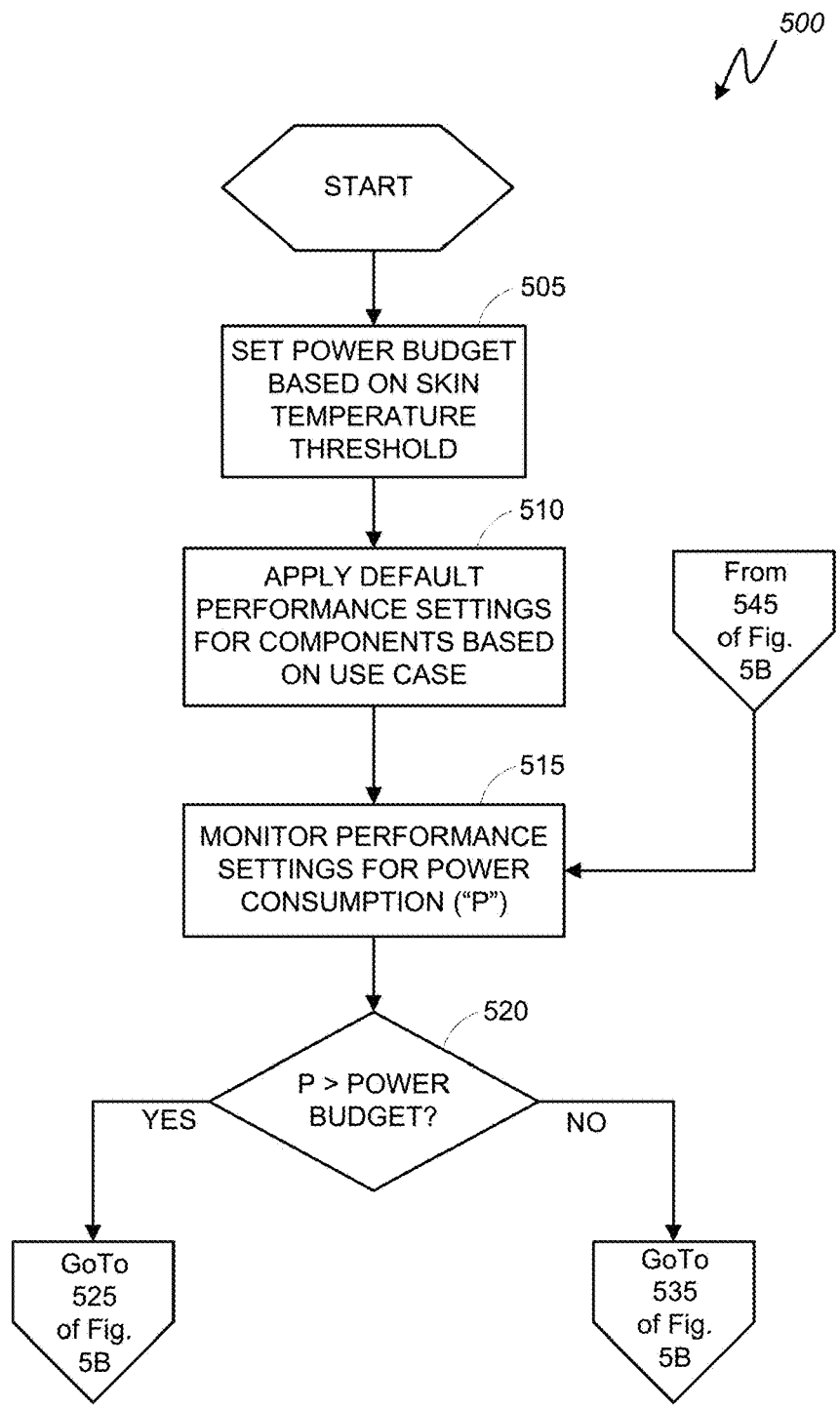
FIGS. 5A-5B depict a logical flowchart illustrating a method for intelligent thermal management in the portable computing device of FIG. 2 through selective adjustments of component performance settings in view of the enhanced thermal power envelope.
Figure 5B:
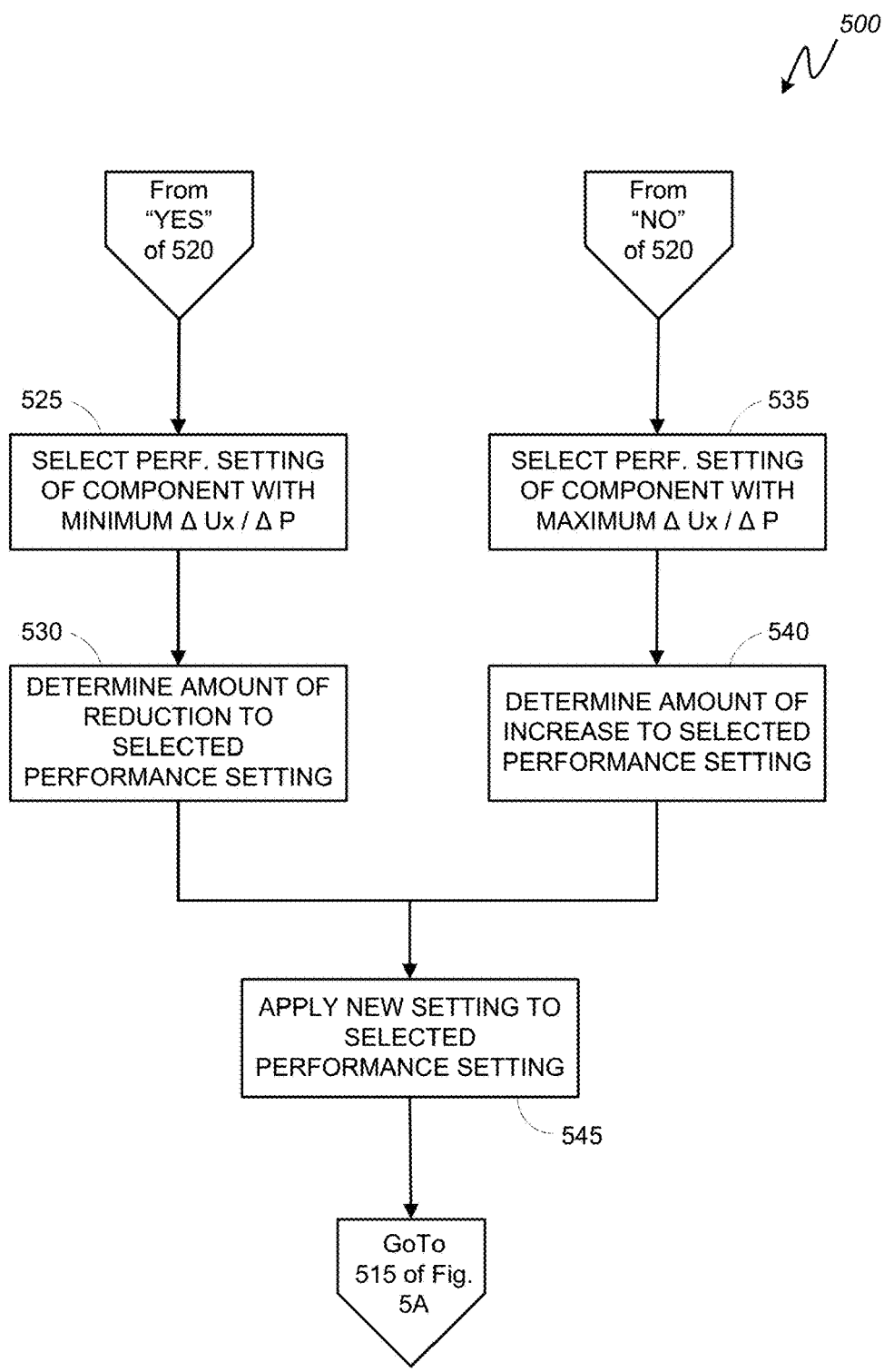

FIGS. 5A-5B depict a logical flowchart illustrating a method 500 for intelligent thermal management in the PCD 100 of FIG. 2 through selective adjustments of component performance settings in view of a thermal power envelope. It should be appreciated that the method 500 may incorporate the enhanced S-TPE 103. Various embodiments for determining and/or generating an enhanced S-TPE 103, which accounts for multiple heat sources, are described below in connection with FIGS. 6-12.

Method 500 starts with a first block 505 where an overall power budget is set based on a skin temperature threshold. As explained above, the TPM module 101 may set an overall power budget that, if adhered to, will not cause an excess of thermal energy to be generated and a skin temperature threshold of the PCD 100 to be exceeded. The skin temperature threshold may be a function of the ambient environmental temperature to which the PCD 100 is exposed, as would be understood by one of ordinary skill in the art.

Next, at block 510, default performance settings for active components in a given use case may be implemented. The default performance settings may cause an overall power consumption by the active processing components that exceeds the power budget defined at block 505 or, alternatively, may not. It is envisioned that the default performance settings of the components for a given use case may be predetermined according to a PCD manufacturer and/or according to user preferences.

At block 515, the power consumption associated with the performance settings may be monitored and compared against the overall power budget (e.g., the enhanced S-TPE 103). At decision block 520, if the power consumption of the active components exceeds the power budget, then the "yes" branch is followed to block 525 of FIG. 5B. If the power consumption of the active components does not exceed the power budget, then the "no" branch is followed to block 535 of FIG. 5B.

At blocks 525, 530 and 545, the performance setting(s) of the component(s) that provide for the least reduction in Ux relative to power savings are adjusted such that the overall power consumption of all the active components in the use case remains at or below the power budget, thereby ensuring that Ux is optimized in view of PCD 100 skin temperature constraints. At blocks 535, 540 and 545, the performance setting(s) of the component(s) that provide for the most increase in Ux relative to increased power consumption are adjusted such that the overall power consumption of all the active components in the use case remains at or below the power budget, thereby ensuring that Ux is optimized in view of PCD 100 skin temperature constraints.

As mentioned above, the enhanced S-TPE 103 accounts for multiple heat sources during TPE collection, thereby resolving the conventional problems of inconsistent S-TPE values. This is accomplished by collecting power and skin temperature data at different operating points of every heat-generating component in the system. In this manner, the enhanced S-TPE 103 is configured to quantify the independent contributions of each component under different combinations and scenarios.

Figure 6:
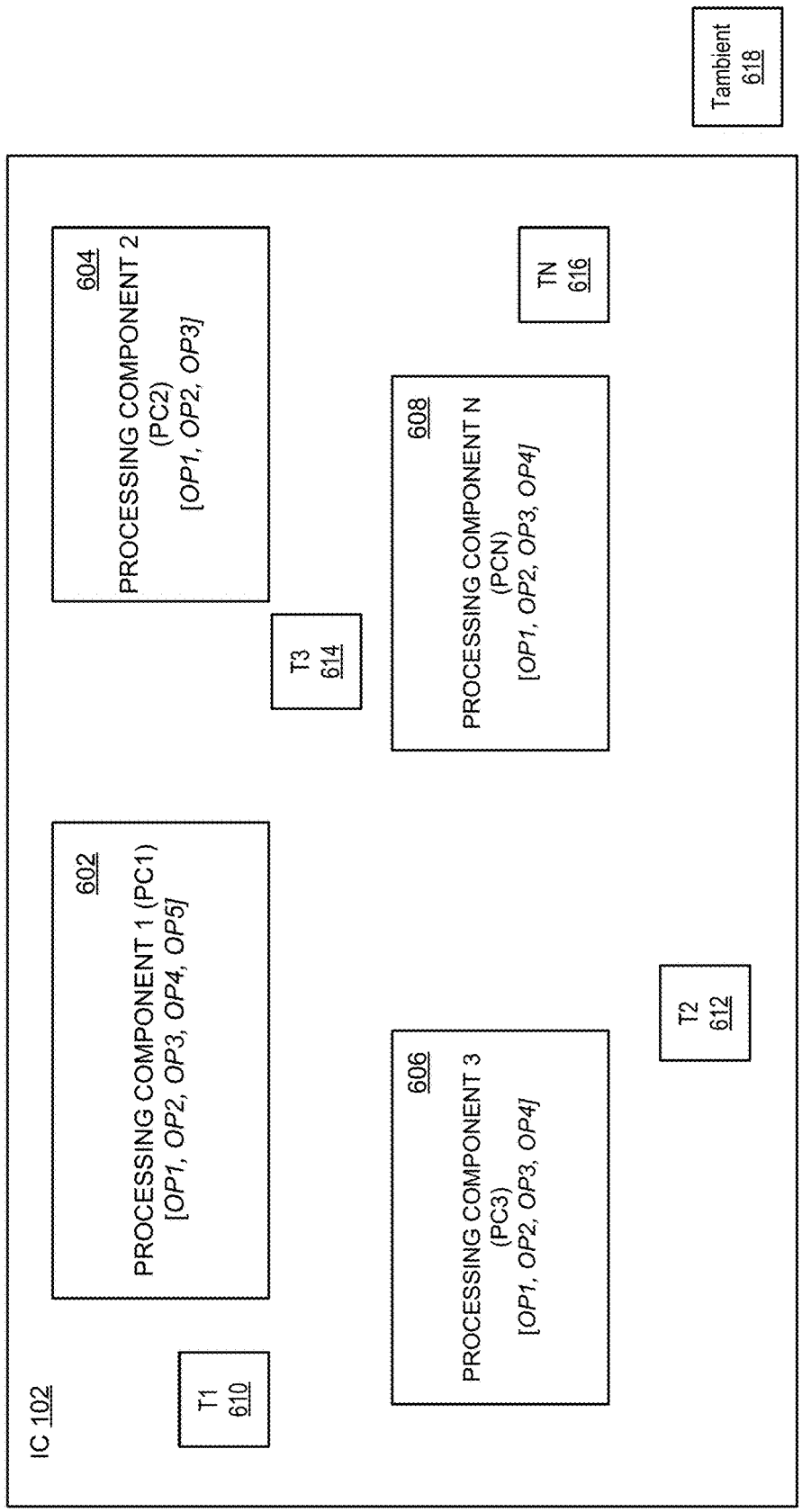
FIG. 6 is a block diagram illustrating an embodiment of a generalized thermal model for determining an enhanced thermal power envelope.

FIG. 6 illustrates an embodiment of a generalized thermal model of the IC 102 for generating an enhanced S-TPE 103. The model of the IC 102 comprises a plurality of processing components and temperature sensors. A first processing component (PC1) 602 comprises a plurality of corresponding operating points (OP1, OP2, OP3, OP4, and OP5). A second processing component (PC2) 604 comprises a plurality of corresponding operating points (OP1, OP2, and OP3). A third processing component (PC3) 606 comprises a plurality of corresponding operating points (OP1, OP2, and OP3, and OP4). An Nth processing component (PCN) 608 comprises a plurality of corresponding operating points (OP1, OP2, OP3, and OP4). It should be appreciated that the system may model any component that generates thermal energy. In this regard, a modeled component comprises any thermal energy generating PCB-level component of the IC 102. The modeled components comprise the heat sources of the system.

As illustrated in FIG. 6, each component has a set of applicable operating points. In general, an operating point is a specific level of intensity at which a component operates. The operating points may correspond to a range of power levels from the component's lowest to its highest operating point. The range of power levels result in different surface temperature profiles depending on the combination of components and their thermal output. In general, the enhanced S-TPE 103 is generated by iterating through the operating points of a component by operating the component at each of the available intensity levels, one after another. Depending on the specific component, the component may be operated at a specific operating point either by direct input request or by applying a specific workload on the component. In an embodiment, application processor may be directly set to run at various clock rates while running processor intensive tasks.

As known in the art, a hotspot is any location on the surface of the device that is hotter than the immediate surrounding area. The temperature at the hotspot may be referred to as the "skin temperature" of the location. On a device with multiple heat-generating components, there may be one or several hotpots on the surface at any given moment. During TPE collection, the iterative process waits for temperature to reach saturation before determining hotspots. Saturation refers to a stable temperature after running the device under a specific test condition for a sustained period. One way to determine temperature saturation is by monitoring a plurality of temperature sensors or thermistors that represent internal temperature. In the model of FIG. 6, the IC 102 may comprise a plurality of temperature sensors (TC1, TC2, TC3 . . . TCN). Hotspots on the surface may vary across time and performance level changes. In general, when performance levels are changed during test iteration, the process waits for temperature saturation and performs a check for hotspots. In other embodiments, equipment such as an infrared camera may be used to determine hotspots during manual testing.

As illustrated in FIG. 6, the temperature sensors may be placed at strategic locations throughout the device. The temperature sensors report the temperature close to the exterior of the device (e.g., the skin temperature). In other embodiments, the temperature sensors may be used to determine hotspots and their temperatures by software means. An external temperature sensor (e.g., Ambient 618) may report an ambient temperature.

In this regard, the generalized thermal model of FIG. 6 represents a system comprising N heat-generating components (PC1, PC2, PC3 . . . PCN). The skin temperatures at various hotspots on the device surface may be represented by T1, T2, T3 . . . TN. Components PC1, PC2, PC3 . . . PCN may comprise any number of operating points. The operating points for a component are represented as OPk, where k=1, 2, 3, etc. The ambient temperature reported by, for example, an external sensor is represented as $T_{ambient}$.

Figure 7:
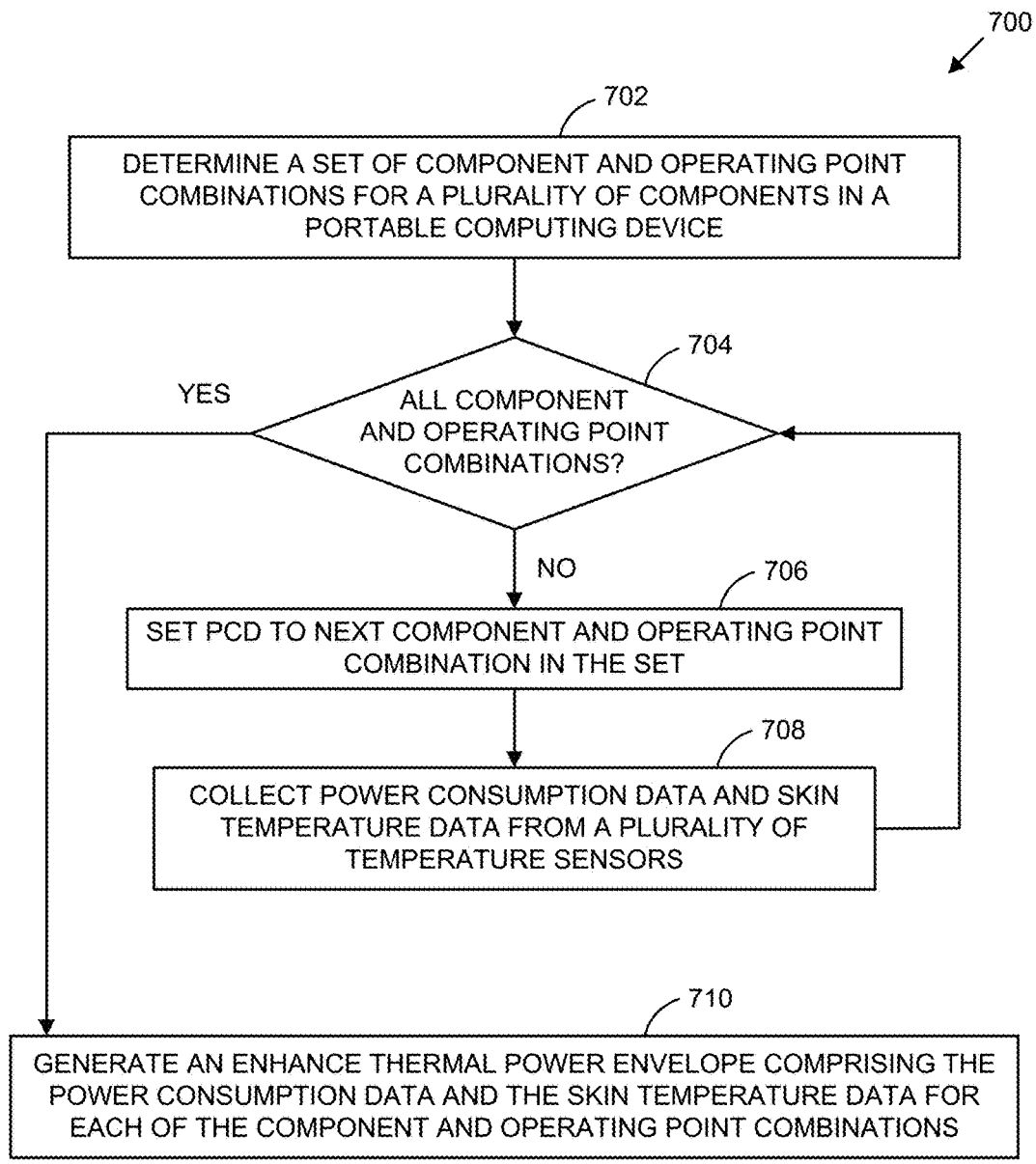
FIG. 7 is a flowchart illustrating an embodiment of a method for determining an enhanced thermal power envelope.

FIG. 7 illustrates an exemplary embodiment of a method 700 for generating the enhanced S-TPE 103. At block 702, a set of component and operating point combinations are determined for the plurality of components in the PCD 100. As described below in more detail, each component and operating point combination in the set defines an available operating point for each of the plurality of components. As illustrated at blocks 704 and 706, the method 700 iteratively sets the PCD 100 to each of the component and operating point combinations in the set. At each of the component and operating point combinations, power consumption data and skin temperature data is collected from a plurality of temperature sensors (block 708). After all iterations have been completed, an enhanced thermal power envelope is generated (block 710), which comprises the power consumption data and the skin temperature data for each of the component and operating point combinations.

Figure 8:
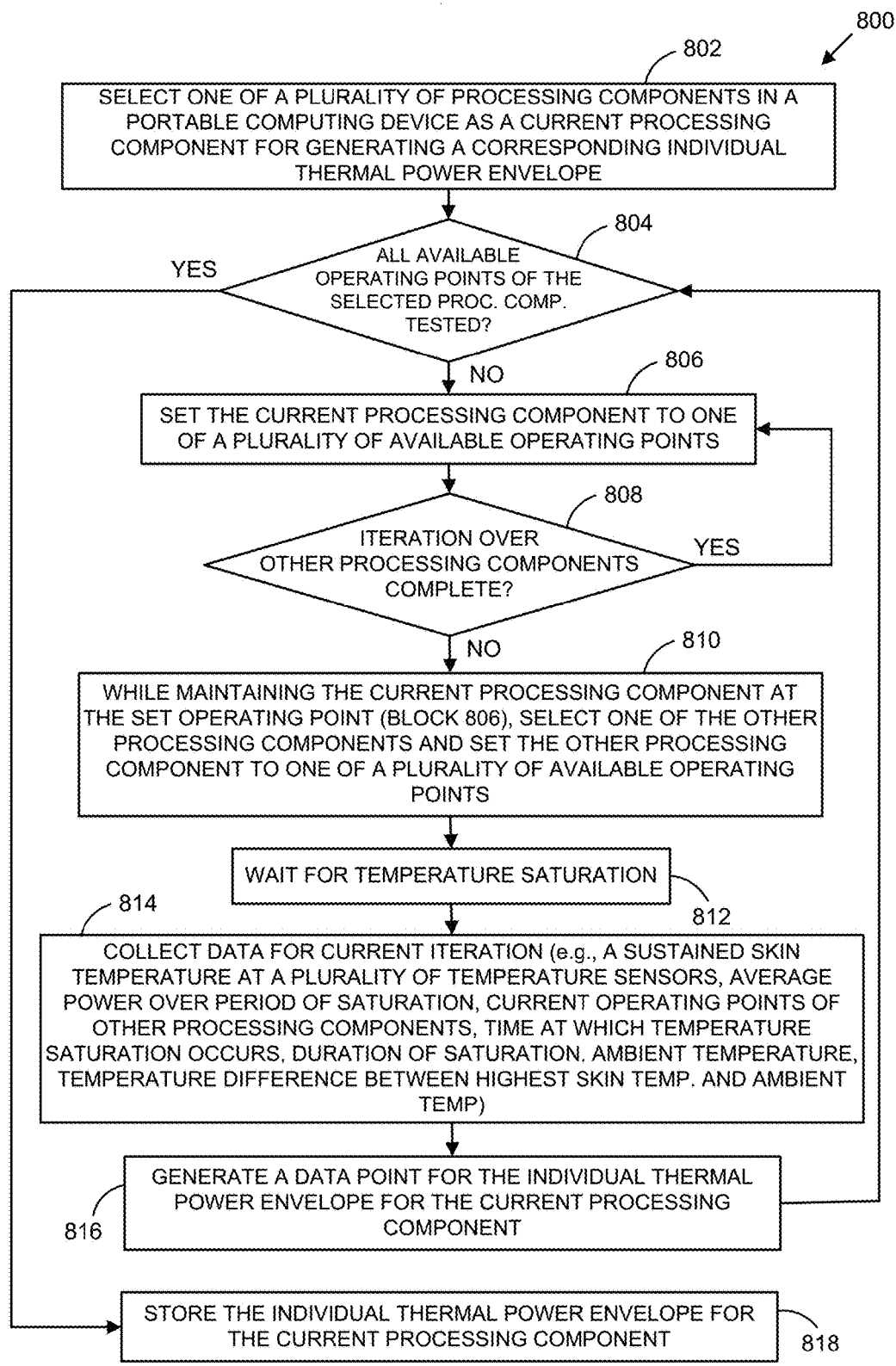
FIG. 8 is a flowchart illustrating an embodiment of an iterative method for determining an enhanced thermal power envelope.

FIG. 8 illustrates another embodiment of a method 800 for generating the enhanced S-TPE 103. Method 800 illustrates the steps for determining an individual S-TPE for one of the components (i.e., an ith component). It should be appreciated that the method 800 may be repeated for each of the components. In this manner, the individual S-TPEs for each of the components may be compared and plotted together for comparison to generate the enhanced S-TPE 103.

At block 802, one of the plurality of components (PC 1 . . . PCN) is selected as a current component for generating the corresponding individual S-TPE. The selected component is represented as PCi. From the available operating points of the selected component (PCi), one of the available operating points is selected (decision block 804). At block 806, if all of the available operating points have not been tested for the selected component, current available operating point is selected the component is set to that operating point. Depending on the particular component, the operating point chosen may be arbitrary or the default operating point, if applicable. While maintaining PCi at the selected operating point, the method 800 iterates through the other components (e.g., PC1, PC2, PC3, . . . PC(i−1), PC(i+1) . . . PCn, as illustrated at blocks 808 and 810. The method 800 iterates over the available operating points of that component (i.e., OPk, k=1, 2, 3 . . . N). For each iteration, the method 800 waits for the temperature for each temperature sensor (T1, T2 . . . TN) to fully saturate (block 812). For each iteration, the method 800 may collect various measures (block 814). In an embodiment, the collected data may comprise, for example, the sustained skin temperature for every hotspot (i.e., T1, T2, T3 . . . TN) and the average power consumption over the period of temperature saturation.

For the current selected component (PCi), the method 800 iterates over all of its available operating points (OPk, k=1, 2, 3 . . . . N). For each iteration, the method 800 may wait for temperature saturation and then collect various measurements for each iteration. The sustained skin temperature for every temperature sensor T1, T2, T3 . . . TN may be collected, as well as the average power over the period of temperature saturation. The current operating points of the other components (i.e., PC1, PC2, PC3, . . . PC(i−1), PC(i+1) . . . PCn may be determined. It should be appreciated that other data may be determined, measured, collected, computed, etc., such as, for example, the time at which the temperature first saturated, the duration of saturation, and the ambient temperature.

In this regard, it should be appreciated that each iteration yields a single data point for the individual S-TPE for the selected component (block 816). The temperature difference between the highest skin temperature and the ambient temperature may be computed. In an embodiment, each S-TPE point in an individual thermal power envelope may be represented on an X-Y scatter plot as (ΔT, Power (W)). After the iterations, the data points on the scatter plot form a complete individual S-TPE that may be stored in a memory (block 818). One of ordinary skill in the art will appreciate that the individual S-TPEs generated by the method 800 for each respective component comprise data representing the relationship between power consumption and skin temperature.

As mentioned above, to fully characterize the system, the method 800 is repeated for each of the N components (PC1, PC2, PC3 . . . PCN). The individual S-TPEs for all components in the system can be plotted together for comparison and stored as data in memory representing the enhanced S-TPE 103. The enhanced S-TPE 103 comprises values that are consistent and comparable across multiple collection attempts. In an embodiment, the highest sustained skin temperature across multiple heat sources in the S-TPE calculations may be used to normalize S-TPE values, thereby accounting for different use cases that apply workload on internal components with different power characteristics.

FIG. 9-14 illustrate an exemplary implementation of the S-TPE collection and generation process in which the testing process involves a subset of all of the possible operating point combinations across all of the components. To fully characterize a multi-heat-source system, the enhanced S-TPE 103 may comprise the sustained power and skin temperature at the available operating points of every heat-generating component in the system. Because the PCD 100 may comprise many heat generating components with a large number of available operating points, testing all of the combinations of the components and operating points may be time-consuming. For example, consider the example in FIG. 10 of a PCD 100 comprising a LCD display and a multi-core processor having a big.LITTLE cluster configuration. The processing components are listed in column 1002 with the corresponding number of operating points in column 1004. Each of two or more Big cluster CPUs may have 24 frequency levels. Each of two or more Little CPUs may also have 24 frequency levels. The LCD display may have 256 or more brightness levels. An enhanced S-TPE 103 for this exemplary system may be generated without actually testing all of the possible combinations of these processing components and operating points.

Figure 11:
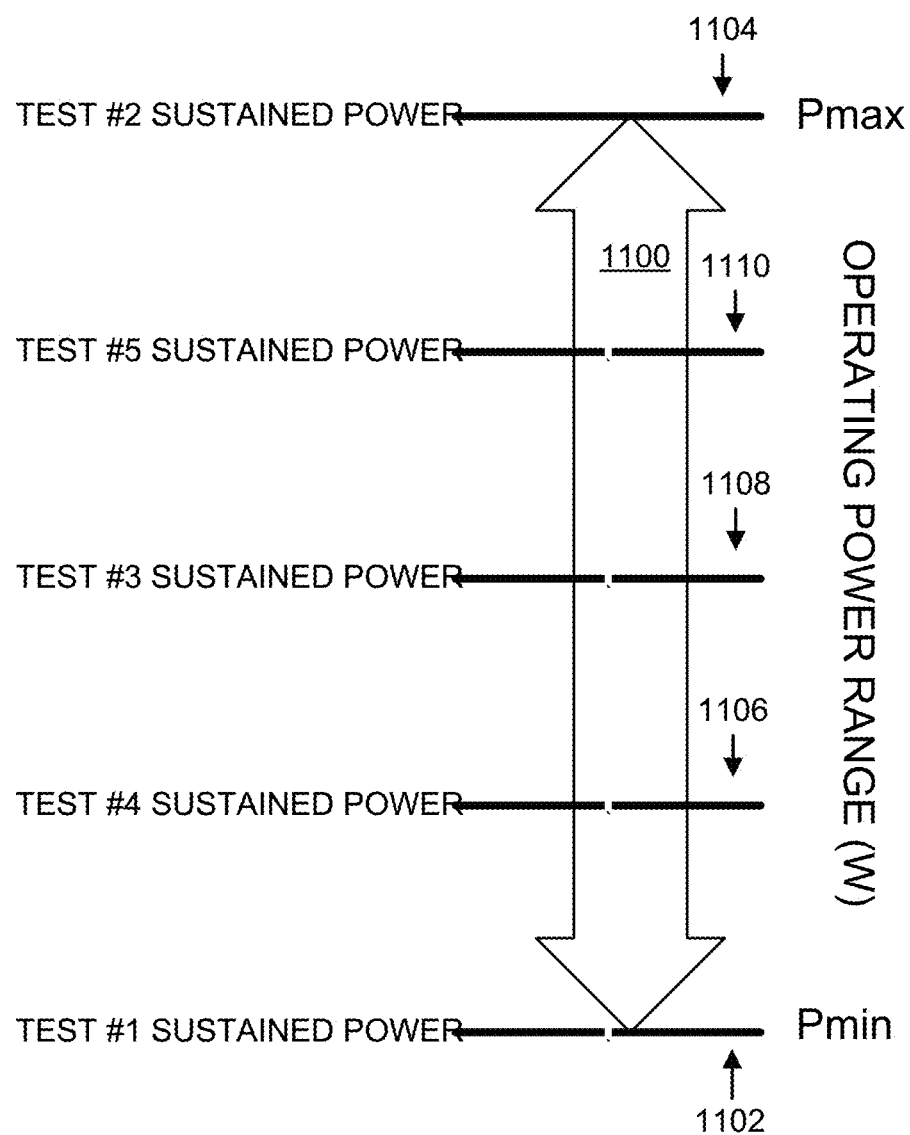
FIG. 11 is a schematic diagram illustrating an operating power range of an exemplary portable computing device with selected power levels for collecting thermal power envelopes.
Figure 13:
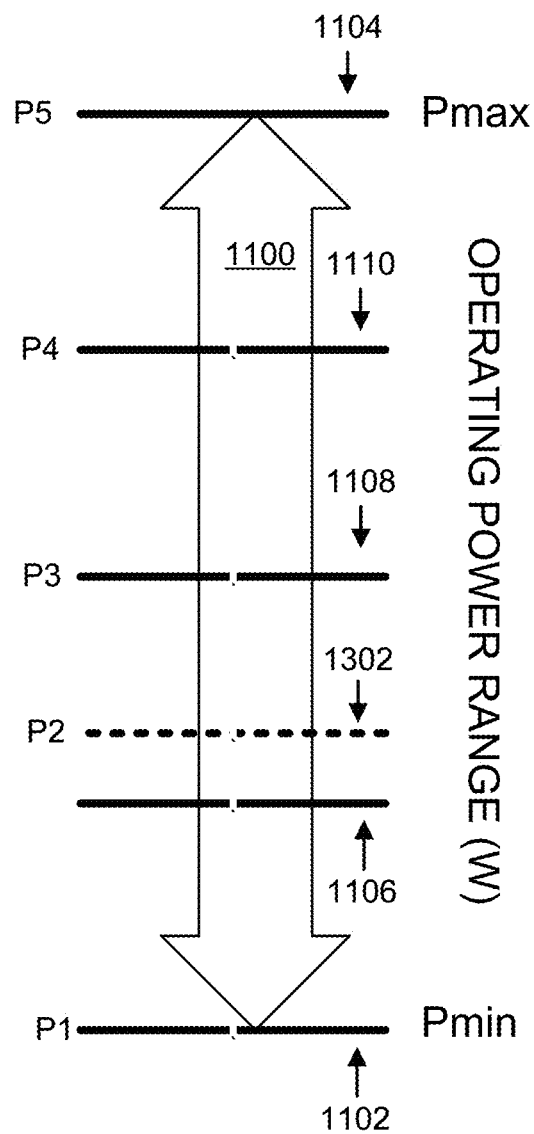
FIG. 13 illustrates the schematic diagram of FIG. 11 with an adjusted P2 power level.

In an embodiment, the S-TPE collection and generation process may involve testing a smaller subset of the possible combinations that still yields enough data to sufficiently characterize the system. As illustrated in FIG. 11, the PCD 100 may comprise a finite range of power consumption represented by arrow 1100. An efficient S-TPE collection process may involve running a limited number of tests that cover the power range of normal device operation. The methods described above may efficiently perform tests at the component/operating point combinations that yield a predefined or calculated number of sustained power levels. The example of FIG. 11 illustrates five tests that are determined to be sufficient to characterize a device with an operating power range between a minimum power level (Pmin) and a maximum power level (Pmax). A first test corresponds to the minimum power level (line 1102). A second test corresponds to the maximum power level (line 1104). A third test corresponds to the power level represented by line 1108. A fourth test corresponds to the power level represented by line 1106. A fifth test corresponds to the power level represented by line 1110.

As illustrated in the exemplary table 1200 of FIG. 12, for each component, the power consumption is recorded for each operating level. The recorded power consumption data may be used to estimate the total power with a variety of combinations of components with specified levels. It should be appreciated that some components may consume significantly more power than others. For example, in the Big.Little configuration represented by FIG. 10, adjusting the operating points of the Big and Little cluster CPUs may have a relatively significant effect on total power consumption. In order to control the total power with a finer granularity, the S-TPE collection process may keep one or more of these components at fixed operating point(s) having a sum that is close to the minimum power level (Pmin). This may provide an effective starting point for testing. For other components (e.g., less power hungry components in a compound subsystem or standalone components such as the LCD driver), their operating points may be varied between tests to observe their contributions. In the example illustrated in FIG. 12, PC1 and PC2 may be fixed at a low operating point, while PC3 and PC4 may be varied. For the iterations, once the power exceeds the maximum power level (Pmax), there may be no further testing needed for the given subspace because the power is expected to be too high. In this regard, it should be appreciated that some components may be identified as consuming a relatively large amount of power. For higher power-consuming components, adjusting their operating points would have a very large effect on total power consumption. In order to control the total power with a finer granularity, these components may be designated as having fixed operating points. In other words, these components may be kept at a fixed low operating point whose sum is close to Pmin in FIG. 11. Other components that consume relatively less power may be designated with variable operating points. Components with variable operating components are iterated between tests to observe their contributions.

The instantaneous power consumed at each component/operating point combination may be measured. It should be appreciated that TPE testing may be advantageously limited to the combinations that produce the desired power consumptions. If a combination yields instantaneous power that is out of operating range or close to a combination already chosen for full S-TPE testing, then it can be considered redundant and dropped. Once the redundant test combinations are dropped, a limited number of test combinations remain that correspond to the desired power consumption, covering the operating range of the device. S-TPE testing may be run and the skin temperatures of each hotspot measure.

Figure 9:
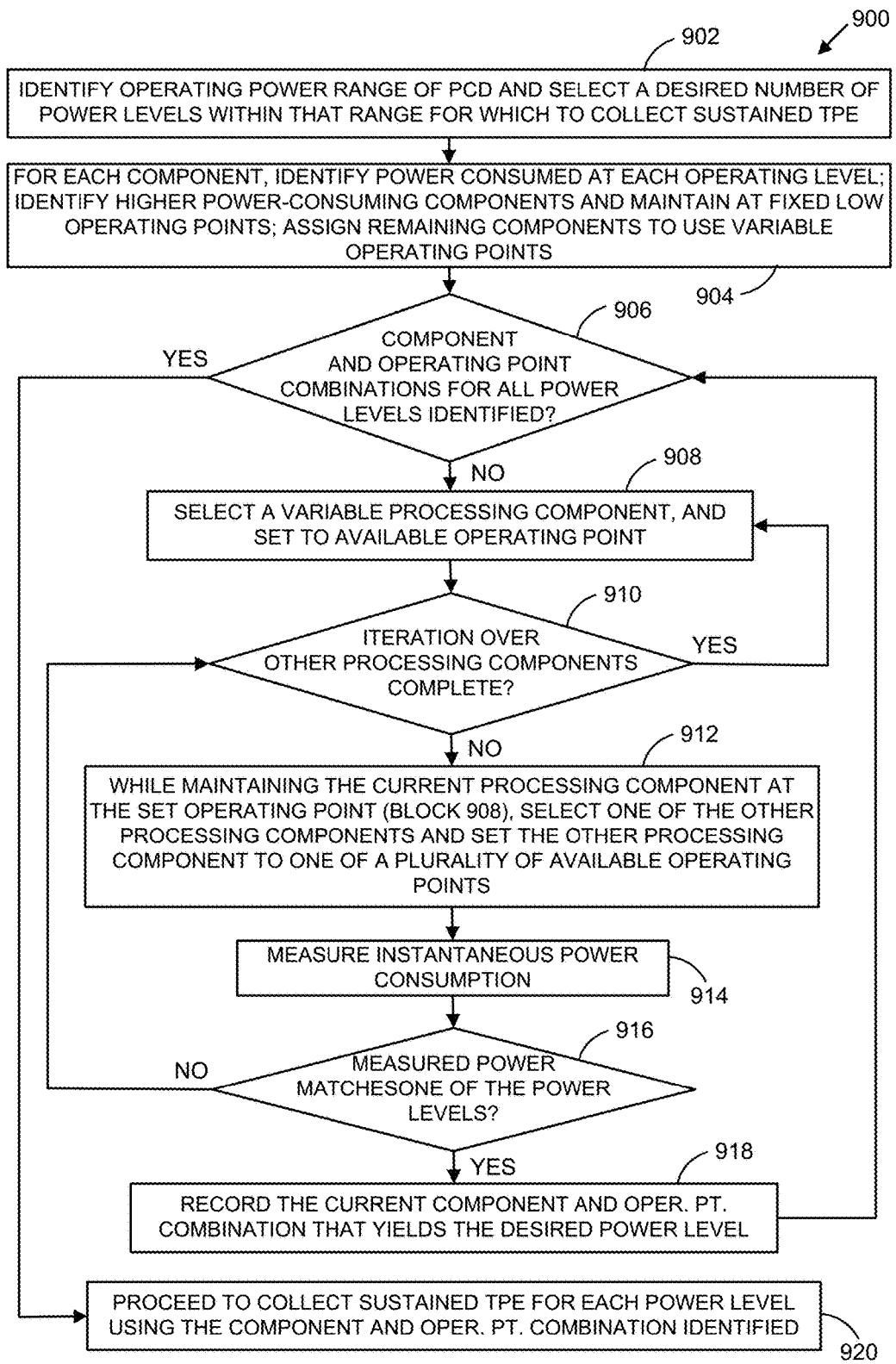
FIG. 9 is a flowchart illustrating another embodiment of an iterative method for determining a reduced number of component and operating point combinations for use in generating an enhanced thermal power envelope.

FIG. 9 illustrates an embodiment of an iterative method 900 for determining a reduced number of component and operating point combinations for use in generating an enhanced thermal power envelope. Blocks 902 and 904 illustrate exemplary initial conditions for the method 900. At block 902, an operating power range of the PCD 100 may be determined. A plurality of desired power levels within that range are selected for which to collect a sustained TPE. For each component, the power consumed at each operating level is identified (block 904). As described above, relatively higher power-consuming components may be identified as fixed components to be maintained at a relatively low operating component. The remaining components may be assigned to use variable operating points. It should be appreciated that the initial conditions represented in blocks 902 and 904 may be performed manually and/or via software.

As illustrated at decision block 906, the blocks 908, 910, 912, 914, 916, and 918 may be repeated until component and operating point combinations are identified for each of the identified power levels. At block 908, the method 900 selects a variable processing component and sets it to one of the available operating points. As illustrated at blocks 910 912, 914, and 916, the method 900 iteratively sets the other processing components to each of the available component and operating point combinations. For each iteration, the instantaneous power consumption may be measured. If the measured power consumption (decision block 916) matches one of the identified power levels, the current component and operating point combination yielding the desired power level is recorded (block 918) and the flow returns to block 906. If the current component and operating point combination does not match one of the desired power levels, another iteration is performed by returning flow to decision block 910. When component and operating point combination(s) are identified for each of the desired power levels (decision block 906), the method 900 may proceed to collect sustained TPE for each desired power level using the matching component and operating point combinations.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for determining a thermal power envelope for a portable computing device, the method comprising:
    (a) determining a first set of operating points for a first component in a portable computing device;
    (b) determining a second set of operating points for a second component in the portable computing device; and
    (c) generating an individual sustained thermal power envelope (S-TPE) for the first component in the portable computing device by:
        (c)(i) setting the first component to a first current operating point in the first set of operating points;
        (c)(ii) while maintaining the first component at the first current operating point, setting the second component to a second current operating point in the second set of operating points;
        (c)(iii) collecting power consumption data and skin temperature data from a plurality of temperature sensors in the portable computing device while the first component is operating at the first current operating point in the first set of operating points and the second component is operating at the second current operating point in the second set of operating points;
        (c)(iv) repeating (c)(ii), and (c)(iii) for each of the second set of operating points for the second component; and
        (c)(v) repeating (c)(i), (c)(ii), and (c)(iii) for each of the first set of operating points for the first component.

2. The method of claim 1, further comprising:
    (d) generating another individual sustained thermal power envelope (S-TPE) for the second component in the portable computing device by:
        (d)(i) setting the second component to a third current operating point in the second set of operating points;
        (d)(ii) while maintaining the second component at the third current operating point, setting the first component to a fourth current operating point in the first set of operating points;
        (d)(iii) collecting power consumption data and skin temperature data from a plurality of temperature sensors in the portable computing device while the second component is operating at the third current operating point in the second set of operating points and the first component is operating at the third current operating point in the first set of operating points;
        (d)(iv) repeating (d)(ii), and (d)(iii) for each of the first set of operating points for the first component; and
        (d)(v) repeating (d)(i), (d)(ii), and (d)(iii) for each of the second set of operating points for the second component.

3. The method of claim 2, further comprising:
    e) comparing the individual S-TPEs for the first and second components.

4. The method of claim 3, wherein comparing the individual S-TPEs for the first and second components comprises combining the individual S-TPEs into an enhanced S-TPE for performing thermal power management of the portable computing device.

5. The method of claim 4, further comprising:
    storing the enhanced S-TPE in a memory for use by an intelligent thermal management module executing on the portable computing device.

6. The method of claim 1, wherein the first component comprises one of a central processing unit (CPU), a graphics processing unit (GPU), and a display, and wherein the first set of operating points corresponding to the CPU and the GPU comprise frequency levels, and the first set of operating points corresponding to the display comprise brightness levels.

7. The method of claim 1, further comprising:
    waiting for each of the plurality of temperature sensors to saturate before collecting the power consumption data and the skin temperature data.

8. A system for determining a thermal power envelope for a portable computing device, the system comprising:
- (a) means for determining a first set of operating points for a first component in a portable computing device;
- (b) means for determining a second set of operating points for a second component in the portable computing device; and
- (c) means for generating an individual sustained thermal power envelope (S-TPE) for the first component in the portable computing device by:
    - (c)(i) setting the first component to a first current operating point in the first set of operating points;
    - (c)(ii) while maintaining the first component at the first current operating point, setting the second component to a second current operating point in the second set of operating points;
    - (c)(iii) collecting power consumption data and skin temperature data from a plurality of temperature sensors in the portable computing device while the first component is operating at the first current operating point in the first set of operating points and the second component is operating at the second current operating point in the second set of operating points;
    - (c)(iv) repeating (c)(ii), and (c)(iii) for each of the second set of operating points for the second component; and (c)(v) repeating (c)(i), (c)(ii), and (c)(iii) for each of the first set of operating points for the first component.

9. The system of claim 8, further comprising:
- (d) means for generating another individual sustained thermal power envelope (S-TPE) for the second component in the portable computing device by:
    - (d)(i) setting the second component to a third current operating point in the second set of operating points;
    - (d)(ii) while maintaining the second component at the third current operating point, setting the first component to a fourth current operating point in the first set of operating points;
    - (d)(iii) collecting power consumption data and skin temperature data from a plurality of temperature sensors in the portable computing device while the second component is operating at the third current operating point in the second set of operating points and the first component is operating at the third current operating point in the first set of operating points;
    - (d)(iv) repeating (d)(ii), and (d)(iii) for each of the first set of operating points for the first component; and
    - (d)(v) repeating (d)(i), (d)(ii), and (d)(iii) for each of the second set of operating points for the second component.

10. The system of claim 9, further comprising:
- (e) means for comparing the individual S-TPEs for the first and second components.

11. The system of claim 10, wherein the means for comparing the individual S-TPEs for the first and second components comprises means for combining the individual S-TPEs into an enhanced S-TPE for performing thermal power management of the portable computing device.

12. The system of claim 8, wherein the first component comprises one of a central processing unit (CPU), a graphics processing unit (GPU), and a display, and wherein the first set of operating points corresponding to the CPU and the GPU comprise frequency levels, and the first set of operating points corresponding to the display comprise brightness levels.

13. The system of claim 8, further comprising:
means for waiting for each of the plurality of temperature sensors to saturate before collecting the power consumption data and the skin temperature data.

14. A computer program product comprising a computer usable device having a non-transitory computer readable program code embodied therein, said non-transitory computer readable program code adapted to be executed to implement a method for determining a thermal power envelope for a portable computing device, the method comprising:
- (a) determining a first set of operating points for a first component in a portable computing device;
- (b) determining a second set of operating points for a second component in the portable computing device; and
- (c) generating an individual sustained thermal power envelope (S-TPE) for the first component in the portable computing device by:
    - (c)(i) setting the first component to a first current operating point in the first set of operating points;
    - (c)(ii) while maintaining the first component at the first current operating point, setting the second component to a second current operating point in the second set of operating points;
    - (c)(iii) collecting power consumption data and skin temperature data from a plurality of temperature sensors in the portable computing device while the first component is operating at the first current operating point in the first set of operating points and the second component is operating at the second current operating point in the second set of operating points;
    - (c)(iv) repeating (c)(ii), and (c)(iii) for each of the second set of operating points for the second component; and
    - (c)(v) repeating (c)(i), (c)(ii), and (c)(iii) for each of the first set of operating points for the first component.

15. The computer program product of claim 14, further comprising:
- (d) generating another individual sustained thermal power envelope (S-TPE) for the second component in the portable computing device by:
    - (d)(i) setting the second component to a third current operating point in the second set of operating points;
    - (d)(ii) while maintaining the second component at the third current operating point, setting the first component to a fourth current operating point in the first set of operating points;
    - (d)(iii) collecting power consumption data and skin temperature data from a plurality of temperature sensors in the portable computing device while the second component is operating at the third current operating point in the second set of operating points and the first component is operating at the third current operating point in the first set of operating points;
    - (d)(iv) repeating (d)(ii), and (d)(iii) for each of the first set of operating points for the first component; and (d)(v) repeating (d)(i), (d)(ii), and (d)(iii) for each of the second set of operating points for the second component.

16. The computer program product of claim 15, wherein the method further comprises:
- e) comparing the individual S-TPEs for the first and second components.

17. The computer program product of claim 16, wherein comparing the individual S-TPEs for the first and second components comprises combining the individual S-TPEs into an enhanced S-TPE for performing thermal power management of the portable computing device.

18. The computer program product of claim 17, wherein the method further comprises:
storing the enhanced S-TPE in a memory for use by an intelligent thermal management module executing on the portable computing device.

19. The computer program product of claim 14, wherein the method further comprises:
waiting for each of the plurality of temperature sensors to saturate before collecting the power consumption data and the skin temperature data.

20. The computer program product of claim 14, wherein the first component comprises one of a central processing unit (CPU), a graphics processing unit (GPU), and a display, and wherein the first set of operating points corresponding to the CPU and the GPU comprise frequency levels and the first set of operating points corresponding to the display comprise brightness levels.

21. A system for determining a thermal power envelope, the system comprising:
a first processing component and a second processing component;
a plurality of temperature sensors; and
a thermal management module comprising logic configured to:
(a) determine a first set of operating points for the first component;
(b) determine a second set of operating points for the second component; and
(c) generate an individual sustained thermal power envelope (S-TPE) for the first component by:
(c)(i) setting the first component to a first current operating point in the first set of operating points;
(c)(ii) while maintaining the first component at the first current operating point, setting the second component to a second current operating point in the second set of operating points;
(c)(iii) collecting power consumption data and skin temperature data from the plurality of temperature sensors while the first component is operating at the first current operating point in the first set of operating points and the second component is operating at the second current operating point in the second set of operating points;
(c)(iv) repeating (c)(ii), and (c)(iii) for each of the second set of operating points for the second component; and
(c)(v) repeating (c)(i), (c)(ii), and (c)(iii) for each of the first set of operating points for the first component.

22. The system of claim 21, wherein the thermal management module further comprises logic configured to:
(d) generate another individual sustained thermal power envelope (S-TPE) for the second component in the portable computing device by:
(d)(i) setting the second component to a third current operating point in the second set of operating points;
(d)(ii) while maintaining the second component at the third current operating point, setting the first component to a fourth current operating point in the first set of operating points;
(d)(iii) collecting power consumption data and skin temperature data from a plurality of temperature sensors in the portable computing device while the second component is operating at the third current operating point in the second set of operating points and the first component is operating at the third current operating point in the first set of operating points;
(d)(iv) repeating (d)(ii), and (d)(iii) for each of the first set of operating points for the first component; and
(d)(v) repeating (d)(i), (d)(ii), and (d)(iii) for each of the second set of operating points for the second component.

23. The system of claim 22, wherein the thermal management module further comprises logic configured to:
(e) combine the individual S-TPEs for the first and second components into an enhanced S-TPE.

24. The system of claim 23, wherein the thermal management module further comprises logic configured to:
store the enhanced S-TPE in a memory for use by an intelligent thermal management module of the system device.

25. The system of claim 21, wherein the first component comprises one of a central processing unit (CPU), a graphics processing unit (GPU), and a display, and wherein the first set of operating points corresponding to the CPU and the GPU comprise frequency levels, and the first set of operating points corresponding to the display comprise brightness levels.

26. The system of claim 21, wherein the thermal management module further comprises logic configured to:
wait for each of the plurality of temperature sensors to saturate before collecting the power consumption data and the skin temperature data.

* * * * *